Figure 11:
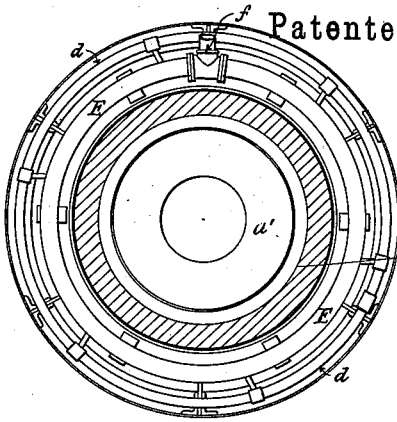

(No Model.)  6 Sheets—Sheet 1.
W. SELLERS.
BREECH LOADING ORDNANCE AND ART OF ASSEMBLING OR DISASSEMBLING PARTS OF SAME.
No. 541,507.  Patented June 25, 1895.
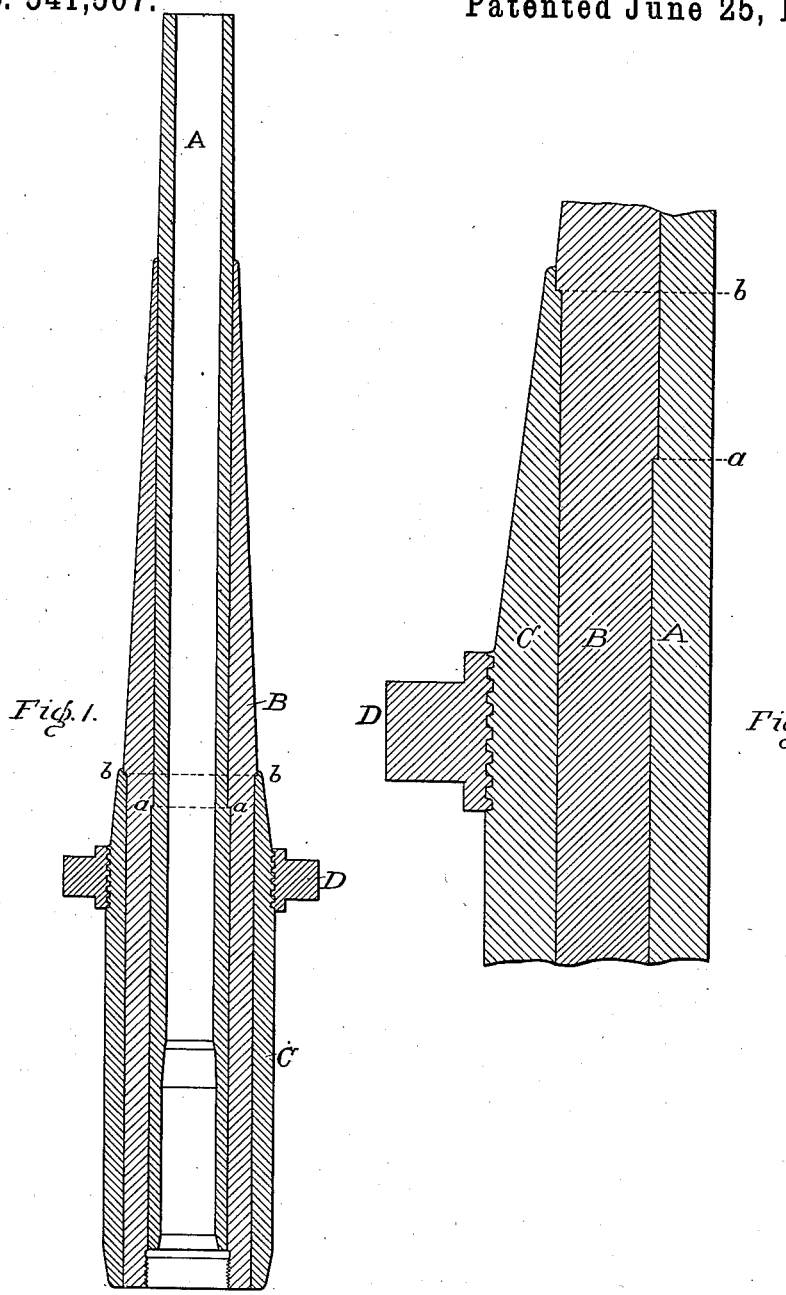
WITNESSES:
John L. Phillips
E. R. Harper
INVENTOR
Wm. Sellers (No Model.)  6 Sheets—Sheet 2.
W. SELLERS.
BREECH LOADING ORDNANCE AND ART OF ASSEMBLING OR DISASSEMBLING PARTS OF SAME.
No. 541,507. Patented June 25, 1895.
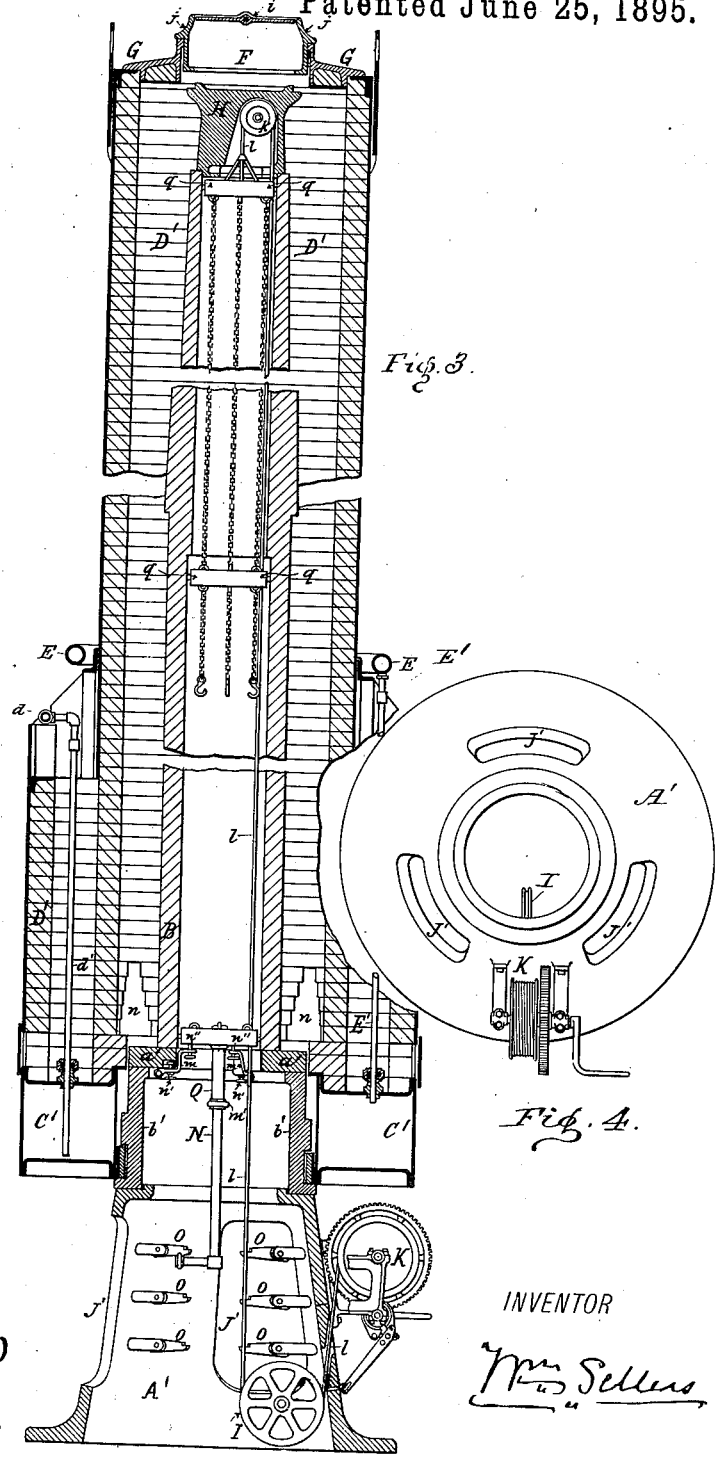
WITNESSES:
John L. Phillips
E. R. Harper
INVENTOR
Wm. Sellers (No Model.) 6 Sheets—Sheet 3.
W. SELLERS.
BREECH LOADING ORDNANCE AND ART OF ASSEMBLING OR DISASSEMBLING PARTS OF SAME.
No. 541,507. Patented June 25, 1895.
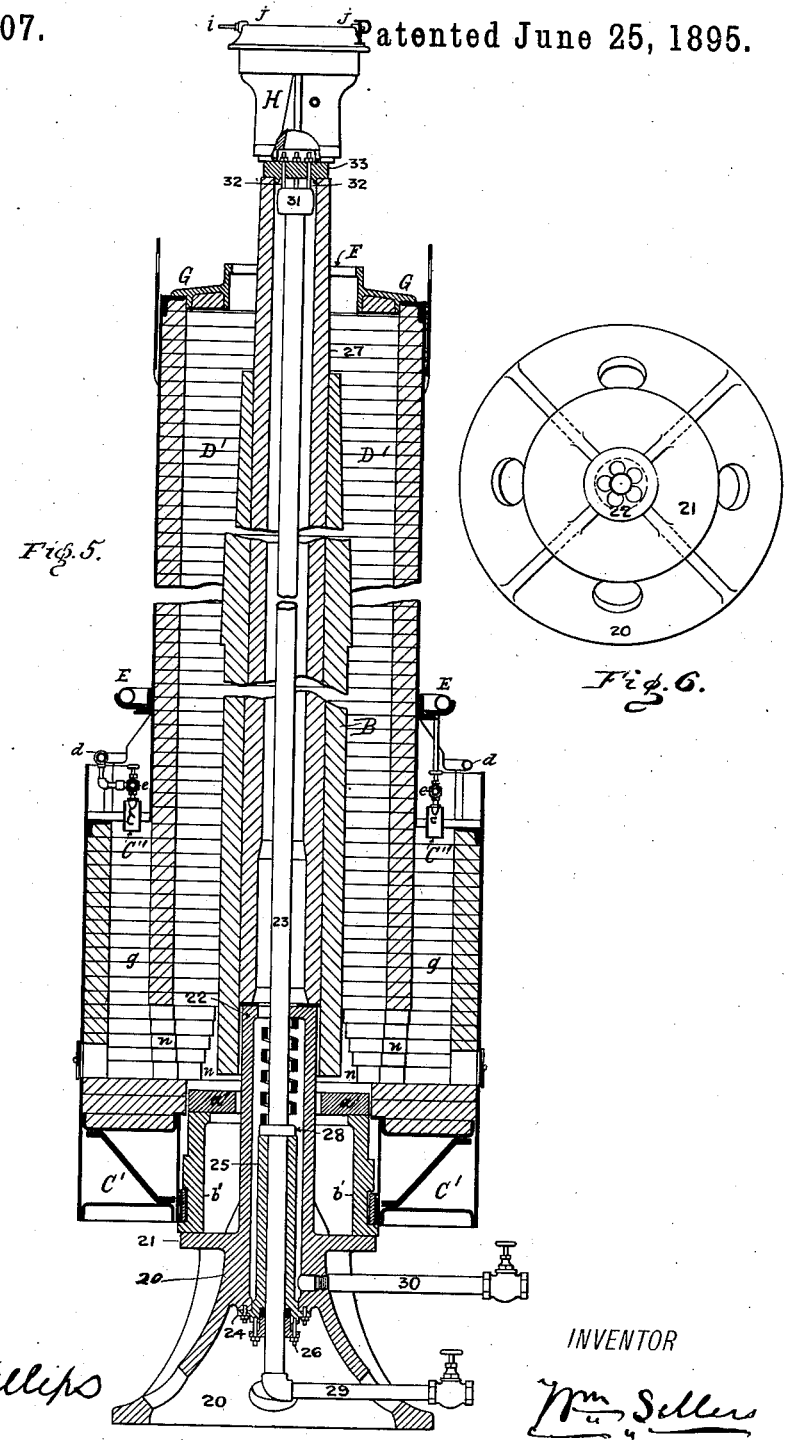
WITNESSES:
John L. Phillips
E. P. Harper
INVENTOR
Wm. Sellers (No Model.) 6 Sheets—Sheet 4.
W. SELLERS.
BREECH LOADING ORDNANCE AND ART OF ASSEMBLING OR DISASSEMBLING PARTS OF SAME.
No. 541,507. Patented June 25, 1895.
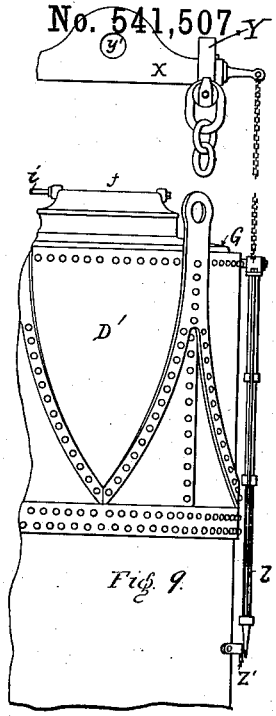
Fig. 9.
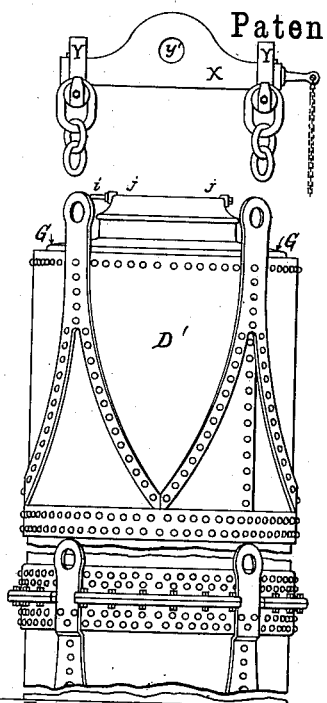
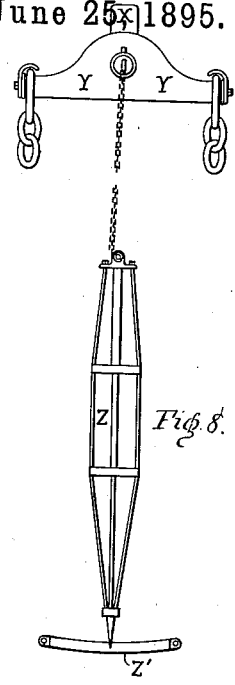
Fig. 8.
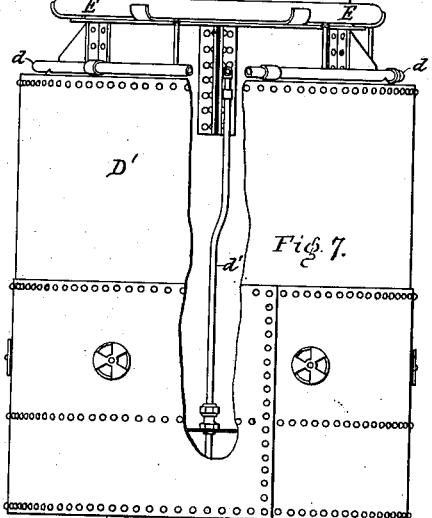
Fig. 7.
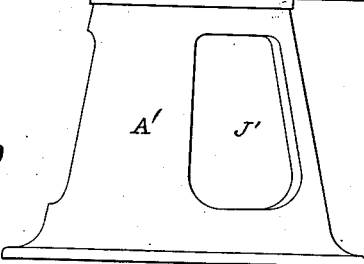
WITNESSES:
John L. Phillips
E. R. Harper
INVENTOR
Wm Sellers (No Model.) 6 Sheets—Sheet 5.

W. SELLERS.
BREECH LOADING ORDNANCE AND ART OF ASSEMBLING OR DISASSEMBLING PARTS OF SAME.

No. 541,507. Patented June 25, 1895.

WITNESSES:
John L. Phillips
E. R. Harper

INVENTOR
Wm Sellers (No Model.)
W. SELLERS.
BREECH LOADING ORDNANCE AND ART OF ASSEMBLING OR DISASSEMBLING PARTS OF SAME.
No. 541,507.
6 Sheets—Sheet 6.
Patented June 25, 1895.
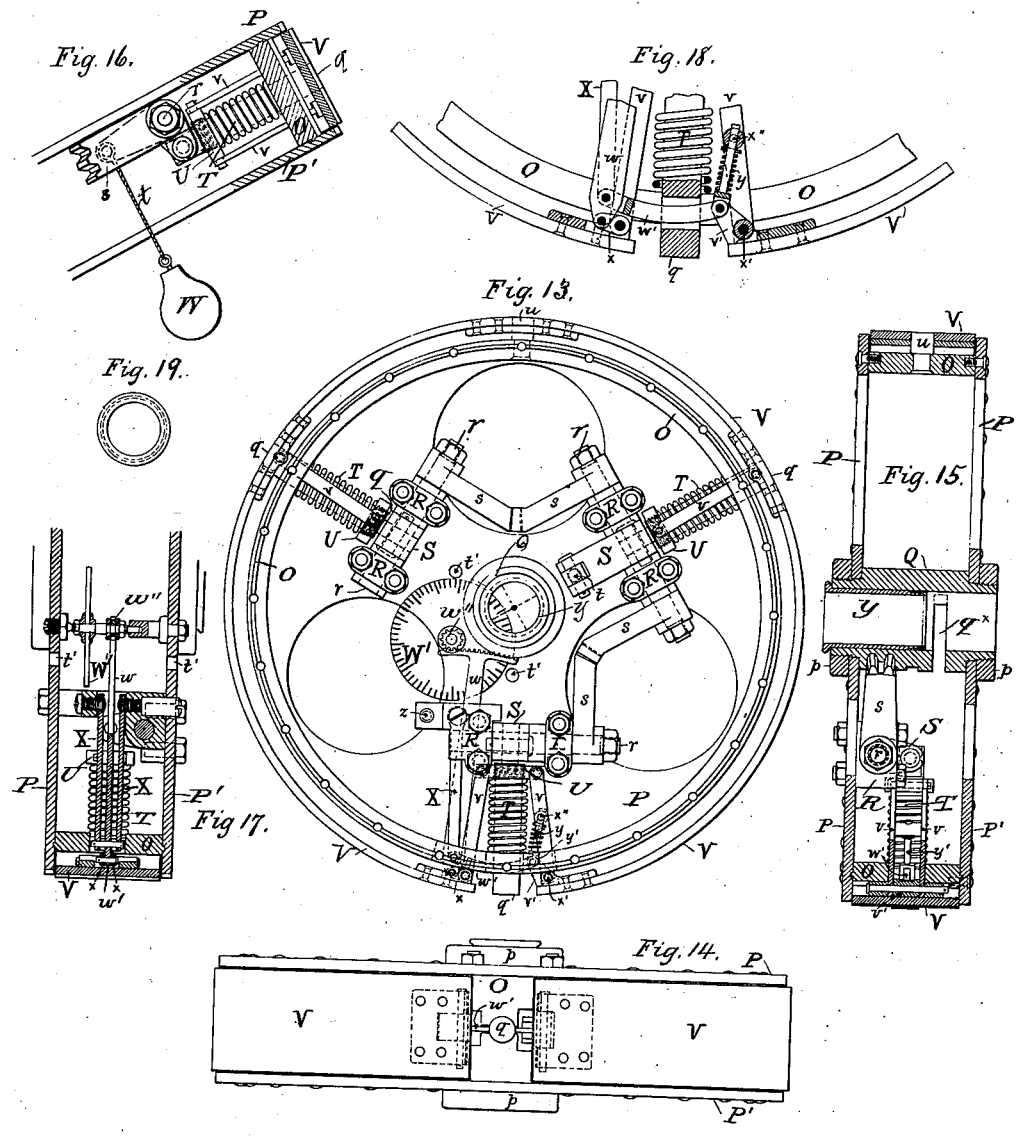
WITNESSES:
John L. Phillips
E. R. Harper
INVENTOR
Wm. Sellers

UNITED STATES PATENT OFFICE.

WILLIAM SELLERS, OF PHILADELPHIA, PENNSYLVANIA.

BREECH-LOADING ORDNANCE AND ART OF ASSEMBLING OR DISASSEMBLING PARTS OF SAME.

SPECIFICATION forming part of Letters Patent No. 541,507, dated June 25, 1895.

Application filed December 22, 1892. Serial No. 456,079. (No model.)

*To all whom it may concern:*

Be it known that I, WILLIAM SELLERS, of the city and county of Philadelphia and State of Pennsylvania, have invented certain new and useful Improvements in Breech-Loading Ordnance and in the Art of Assembling and Disassembling the Parts of the Same, of which improvements the following is a specification.

In the progress of the art of making built up guns, the tube has from the beginning been in one piece, but at first it was comparatively short, and was reinforced by additional metal in normal condition. An explosion would expand the bore, and this expansion would reach the outer portion of the gun with a continuously decreasing intensity, so that the outer layers would be scarcely strained. This was remedied, by shrinking the reinforce, in short cylinders, upon the tube, so that all the metal in the reinforce would be in tension, and the tube under it in compression, whereby all the metal in both would instantly resist all strains at right angles to the bore.

In the modern breech loading gun to which my improvements in the art of constructing are more especially applicable, the tube remains the basis upon which the gun is built up, but it is very much longer than its predecessor. It is of forged steel in one piece, and it is bored to suit the diameter of the projectile to be used therewith. The breech end of the bore is enlarged to form a powder chamber, while the exterior of the tube is cylindrical, and usually of several diameters, the smallest at the muzzle. This tube is reinforced by a jacket at the breech and by several hoops between the jacket and the muzzle of the tube, the first of which abuts against the jacket, the second against the first, and so on to the last. The jacket and the hoops are shrunk upon the tube, so that they will be under a strain to a limited extent when in place upon the tube. The thickness of the tube being determined, this strain is regulated by the difference between their interior diameters, and the exterior diameter of the tube, when they are all at the same temperature. In the larger guns, this first series of reinforcements, is supplemented by a second series, which is shrunk upon the first in the same manner, that the first series is shrunk upon the tube, so that such guns, are composed of a very large number of separate and independent pieces, but whether the gun is composed of one, or of more than one series of reinforcements, each series is so constructed, that when shrunk to place, it is in a state of tension. In the construction of such guns, each reinforcement must have its ends turned true, it must be truly bored and the exterior of the tube accurately turned to the size required, to produce the requisite strain upon each reinforcement when it is shrunk to its proper place thereon, but it is impossible to shrink on one piece after another successively and immediately until the whole are assembled, for it happens that the ends of the reinforcements are frequently distorted by shrinking them on the tube, and that the tube itself is also distorted. As it is absolutely requisite to make good work, that the tube and the squared end of any reinforcement shall be true with each other, it becomes necessary to true up both, after each reinforcement is shrunk in place. When therefore, all the parts, tube, jacket and hoops are properly prepared, the jacket is first shrunk upon its place on the tube. Then the tube and jacket are returned to the lathe, the end of the jacket next the first hoop is trued up, the seat for the first hoop on the tube is turned to exact size, the first hoop is then shrunk to place, the tube is then returned to the lathe, the exposed end of the first hoop is trued up, the seat for the second hoop is turned to exact size, the second hoop is then shrunk to place, and this process is repeated with each successive hoop until all are assembled upon the tube. All of this involves a great deal of time and care by highly skilled mechanics in the preparation of the several parts, while the work of assembling must necessarily be slow, and the handling excessive. In this form of gun the tube is supposed to be strong enough in itself, to resist all of the bending and longitudinal strains that can come upon it in service. The jacket and hoops of these guns are reinforcements provided to resist the bursting strains alone, for as the hoops merely abut against each other, or are imperfectly locked together, they can add little to the strength of the tube as a beam, and practically nothing to its longitudinal strength.

Very many experiments in the ordnance departments of the world have been made and are now making, upon wire wound guns. Such reinforcements, while affording perhaps superior resistance to bursting strains, are less effective even, than jacket and hoops for imparting beam strength. Experiments of this character, in connection with the now universal practice of reinforcing with jackets and hoops, show that the necessity for increasing the beam strength of the gun has not been recognized, or that the means for accomplishing it are unknown.

As guns become larger, the transverse stress due to the weight of the gun, increases faster than the strength to resist it. The deflection of the muzzle increases in a still greater ratio, for with similar guns, the droop at the muzzle will be as the square of the diameters of the bore, that is, a sixteen inch gun, will droop four times as much as an eight inch, and with guns of the same diameter and bore but of different lengths with a weight proportional to the length, the droop at the muzzle will be as the fourth power of the ratio of the lengths, that is, if one gun is twice as long as the other, the droop of the long gun will be sixteen times that of the short gun.

When a long modern gun is mounted it will droop at the muzzle from its own weight, and its bore will be a curve. When it is fired, the shot will tend to move in a straight line and cause the muzzle to whip. The amplitude of the whipping in similar guns will be approximately as the squares of the bore, and as short hoops have comparatively slight adhesion, the whipping action, with the shock of the explosion, will cause the joints between the several hoops and the jacket of the reinforce, to open. While the hoop reinforce does not materially strengthen the tube against this whipping action, the weight of the hoops themselves, increases the tendency to droop and adds momentum to the whipping action, which may thus give the tube a permanent set, a result that has been attained on some of the larger modern guns in a few rounds. The necessity for increased beam strength in the great guns now required, is therefore evident.

In the process of assembling such guns by shrinking one part upon another as heretofore practiced, the part to be heated is placed in a heating chamber or in a furnace, and its temperature raised the required amount. It is then removed from the heating chamber and transferred to and imposed upon, the part designed to receive it. In this removal, transfer and imposition, it is losing heat, and this loss may by accident or by carelessness, be protracted so as to cause it to seize the piece prematurely, upon which it is being imposed. If the heated part which is to be imposed upon the part designed to receive it, should from any cause seize or shrink upon that part, before it has reached its proper position, there has been no means provided heretofore, for releasing and removing it, nor have any means been devised, for separating the parts of a built up gun, after such parts have been properly assembled by shrinking one part upon another. If seizure should occur prematurely, in the process of assembling, the only remedy has been, to cut off the part which has seized, and replace it with another. Heretofore also, in the case of properly assembled guns, the whole gun was condemned, when the tube had burst, or had become too much worn, or had otherwise been damaged so as to be unfit for service, and all parts of the gun were then valueless, except for scrap.

The objects of my improvements therefore are, to obtain a greatly increased beam strength without any increase of metal, to simplify the construction, to reduce the cost, to diminish the time of assembling, to maintain the heat and dimensions of the heated part during the assembling operation, to separate the parts after they have been assembled by shrinking one part upon another, and to provide apparatus whereby these several objects may be accomplished. To these ends, I make the tube of the gun in one piece of the length required, with a bore roughed out, approximating its finished size, to suit the diameter of the projectile to be used therewith, and a jacket in one piece of a length to sustain the breech plug and to embrace all the surface of the tube which requires to be reinforced against strains of any kind, a second jacket if the first requires to be reinforced, the second of a length to embrace all the surface of the first which requires to be reinforced, and so on until all the metal of the gun is provided, ready for assembling. For this purpose I provide a portable heating chamber long enough to contain the first jacket, and strong enough to sustain its own weight with that of the jacket within it, when suspended from a crane by which it is transported to and lowered over the tube which is set vertically to receive it. The second jacket is imposed upon the first by the same means and in like manner, and provision is made for cooling the tube from the interior. When the assembling has been completed the bore is finished to the proper size. The same apparatus affords the means for separating the parts of the gun after they have been assembled by shrinking one part upon another, as will be more particularly described hereinafter. After shrinking this long jacket upon the tube, all the metal of the jacket will be in tension and all of the tube under it in compression. The tension is produced by the contraction of the jacket after it seizes the tube in the act of cooling, and this contraction takes place equally both circumferentially and longitudinally. The tension is caused by the resistance which the tube offers to the contraction of the jacket, and it is limited by the difference of temperature between the jacket and the tube when the jacket seizes the tube so as not to slip. Circumferential contraction creates no tendency to slip, but longitudinal contraction will cause slip until there is sufficient surface under circumferential tension to prevent it, that is, until the friction between the jacket and the tube, where the circumferential tension will be at its maximum, equals the longitudinal stress produced by the longitudinal contraction. The friction of such metal surfaces sliding upon each other, has been proved experimentally, to be about twenty per cent. of the load, from which it follows, that when both ends of a jacket are held to the tube by friction alone, it must have a length equal to ten times the diameter of its bore, before a longitudinal tension can be set up equal to the circumferential, by shrinking it upon a tube. As the circumferential tension is limited by the difference of temperature between the jacket and the tube when the jacket seizes the tube, it follows that the greatest longitudinal tension that can be produced in a jacket of the above length, cannot exceed its maximum circumferential tension, but if the jacket is cooled from the center toward the ends it may be less, and a less length will result in a less longitudinal tension. Increasing the length of the jacket beyond ten times the diameter of its bore, will not increase the longitudinal tension, because this tension has reached its maximum when the jacket does not slip on the tube. Therefore, the longitudinal tension can never exceed the circumferential with any length of jacket, unless the longer jacket is cooled at the ends. From this it follows, that in the jackets and hoops heretofore used, the longitudinal strain is proportional to the length of the jacket or hoop, but with a jacket or hoop of a length equal to ten times the diameter of its bore, and longer, the longitudinal strain is not proportional to the length of the jacket or hoop. When the entire length of the reinforce is in one piece, and shrunk upon the tube, all the metal of the tube in and under the reinforce will be strained in two directions, circumferentially and longitudinally, that is, at right angles to each other, and therefore, the metal in the tube can yield only in a third direction, toward its axis. In this condition the tube will sustain a greater pressure from the reinforce, and a higher explosive pressure. With an explosion in a gun thus strained, all the metal of the gun, in and under the reinforce, whether behind or before the shot, instantly responds to resist it, whereas, in the modern built up gun where the reinforce is divided into separate sections, which excludes longitudinal strain throughout the reinforce, an explosion is resisted by the circumferential strain alone.

As a consequence of my construction, I increase the stiffness of the gun without any increase of metal, thereby lessening the amplitude of its vibrations when fired, and as these vibrations require power to produce them, which otherwise would be expended upon the shot alone, by lessening them I increase the velocity of the shot with the same charge. I also reduce the time and labor now required for making and assembling the parts, and I obtain a gun which may conveniently and practically be taken to pieces and reassembled, after it has been in service, whereby any part which may have been damaged by such service can be removed and a new part substituted therefor, so that the original value of the gun may be restored.

The apparatus I have devised for assembling the parts, enables the operator to control the process of assembling with certainty; to determine before assembling, whether any reinforcement such as a jacket has been bent in the process of expanding it to the proper diameter to assemble it; to determine the temperature of any reinforcement throughout its length, in advance of assembling, and enables the operator to retard or to arrest the process of assembling in advance of any disposition to seize prematurely.

In order to assemble the parts of a gun by shrinking one part upon another when it is constructed as proposed, I have contrived a portable heating chamber, preferably an iron shell lined with brick, in which one of the parts to be assembled is heated and retained, until it is in its place on that part of the gun designed to receive it; a series of centering chucks supported within the reinforcing piece or jacket to be heated, and a telescope and cross hairs, or their substitutes, by means of which the alignment of the chucks and consequently the straightness of the jacket, can be determined at sight, in advance of assembling; a series of thermometers or pyrometers, and an illuminating apparatus, whereby the temperature at each chuck can be observed through the telescope in advance of assembling; an index vibrating about an axis fixed to the outside of the portable chamber and so connected to a contrivance from which the chamber is suspended, that any resistance to the descent of the jacket and chamber will cause a movement of the index, and a cooling apparatus by which the inner part can be maintained at or near its normal temperature, when the heated part is imposed upon it, and by which all the parts can be rapidly cooled from the interior when required, and these together constitute the best apparatus known to me for the purpose of carrying out or working my improvement in the art of constructing such guns.

I will first describe the construction of the gun, referring to the drawings thereof, and then to the drawings of the apparatus which I have found most convenient for assembling and for disassembling the parts of such built up breech loading guns. In order that the details may be shown clearly, a large scale is required, and the parts of the assembling apparatus showing the gun and the heating chamber are therefore represented as broken, their great length making it impossible to show their full length, within the size of a drawing for a patent.

Sheet 1, Figure 1, represents a longitudinal section of a built-up breech-loading gun of my improved construction. Fig. 2 shows an enlarged longitudinal section of one side of the same. The breech-plug is not shown in these drawings, that forming no part of my present invention. The arrangement of the several parts of the gun shown in Fig. 1 is adapted to the interrupted screw for securing the breech-plug in place; but any other device for securing the breech-plug may be employed, and these parts may be modified to suit the same without affecting my invention.

In Fig. 1, A is the gun tube, the bore of which is enlarged at the breech end to form a powder chamber, and this end of the tube is also the largest in its exterior diameter, the junction between the larger breech end and the smaller muzzle end of the tube, forming a shoulder. Shown by the dotted line $a\ a$. The jacket B has a bore conforming to the exterior of the tube A, therefore having a shoulder which, when the jacket and tube are assembled, rests against the shoulder on the tube. These shoulders on the tube and jacket determine the exact position of the jacket on the tube in assembling, and as the breech plug is secured to the jacket and rests against the tube, when it is in place, the jacket and tube are securely locked longitudinally in both directions when the gun is fired. The exterior of the jacket B is turned truly cylindrical at the breech end, for a length nearly equal to that of the outer jacket C. Beyond this it is enlarged to form a shoulder. Shown by the dotted line $b\ b$. Forward of this it is turned cylindrical for a distance which in conjunction with the longer cylindrical portion at the breech end, equals the total length of the jacket C, and beyond this it is turned taper as clearly shown upon the drawings. The outer jacket C has a bore conforming to the exterior cylindrical portion of the jacket B, therefore having a short enlarged cylindrical interior or bore at the end toward the muzzle of the gun. This short enlarged bore is intended to cover the vertical joint between the outer jacket C and the jacket B at the dotted line $b\ b$ and thus prevent the admission of moisture at this joint. It is made short in order that the enlarged bore can be formed with a turning tool. The outer jacket C is turned cylindrical upon its exterior except a small conical portion at the breech end. Near the front end it may be reduced in diameter to form a shoulder for the trunnion ring D. Upon this jacket a screw thread may be cut to conform to that of the trunnion ring, and beyond this ring, toward the muzzle, this outer jacket is turned taper as shown. The trunnion ring D is of the ordinary construction, and may be shrunk upon the outer jacket C, the screw threads and shoulder locking it to place. The section of this trunnion ring and the shoulders $a\ a$ and $b\ b$ are more clearly shown in Fig. 2.

From the above description of my improved gun, it will be understood that the tube is in one piece, bored to suit the diameter of the projectile to be used therewith, and provided with a reinforcement or jacket of such length, that it shall be long enough to sustain and will support the breech plug, and likewise surround and strengthen the tube throughout the whole portion of its length which is to be reinforced. This jacket is shrunk upon the tube, and in this part of the operation the jacket must be first heated to a temperature which will expand it sufficiently circumferentially, to pass freely over the tube, but in expanding it circumferentially, it must also expand longitudinally, and when so expanded it is imposed upon the tube. As the jacket cools it will shrink or contract and seize the tube. This will produce tension in the jacket and compression in the tube, which will continue to increase until both jacket and tube attain a uniform temperature. The jacket will seize the tube in a few minutes after it has been imposed upon it, but under natural conditions it will continue to shrink and increase its tension very much longer. After the jacket has seized circumferentially, it still continues to shrink equally both circumferentially and longitudinally, and in so doing, the interior surface of the jacket and the exterior surface of the tube must slide upon each other longitudinally to permit the necessary longitudinal contraction of the jacket, or the jacket must be extended and the tube must be shortened. The enormous friction of surfaces of such length under the great circumferential strain to which they are subjected, will cause an extension of the jacket and a shortening of the tube, but as the longitudinal tension of the jacket cannot exceed its circumferential tension, and as this latter is determined by the difference of diameter between the bore of the jacket and the exterior of the tube when both are at the same temperature, the degree of stress both circumferentially and longitudinally is easily determined in advance of assembling.

In all of the larger guns, the long jacket above described, is supplemented by a shorter one, imposed upon the breech end of the first, and this like the first is in one piece and of such length as to cover all of the first that requires to be reinforced. This second jacket is shrunk upon the first in the same manner as the first is shrunk upon the tube, and with like effect, so that when the gun is thus assembled, all the metal throughout the built up portion of it, is in stress both circumferentially and longitudinally.

Figure 10:
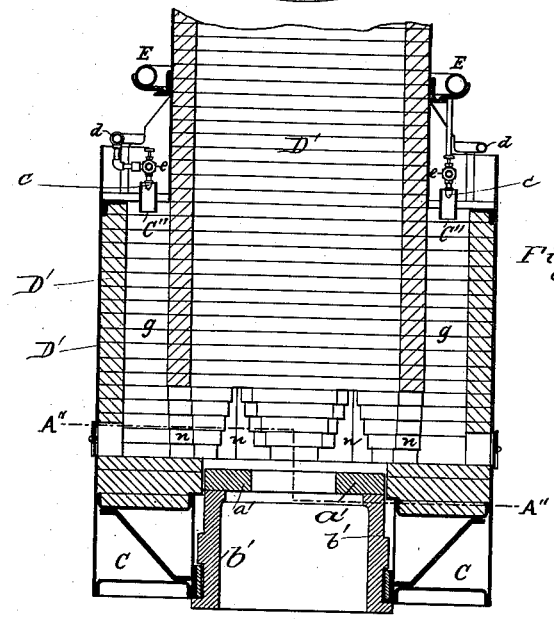
Figure 12:
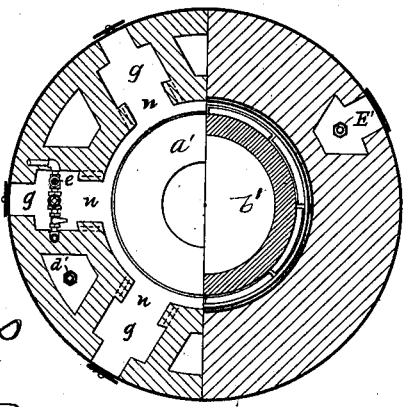

The apparatus by means of which the parts of such a gun may be successfully assembled by shrinking one part upon another is shown in the following drawings, in which Sheet 2, Fig. 3, represents in vertical section the heating-stand with the heating-chamber and the longest or inner jacket of the gun mounted thereon. It also shows the cover-cap for the jacket to prevent the products of combustion from the furnaces from having access to the interior of the jacket, which cover also affords means for supporting the centering-chucks, which are shown within the jacket, and the means for raising the chucks to their place are also shown. The furnace is broken away on one side to make room for Fig. 4, which is a plan of the heating-stand. Sheet 3, Fig. 5, represents in vertical section an assembling-stand with a gun-tube and its jacket mounted thereon inside the heating-chamber, which is shown as resting upon the assembling-stand. All of these parts are shown in the position they would occupy after the jacket has been lowered over the tube. Fig. 6 is a plan of this assembling-stand, showing the cooling-pipe in cross-section in its center. Sheet 4, Fig. 7, is an elevation of the heating-stand with the heating-chamber mounted thereon, also the means for suspending this chamber and for dividing it, so as to convert it into a shorter chamber for heating a hoop or the outer jacket of the gun. The furnace end is broken away to show the attachment of the furnace-casing to the heating-chamber casing and the oil-supply pipe between the two. Fig. 8 is a front elevation of the index and its connection to the contrivance which supports the heating-chamber; and Fig. 9 is a side elevation of this index, showing its connection to the outer shell or casing of the heating-chamber. Sheet 5, Fig. 10, represents in vertical section the lower end of the heating-chamber, showing its furnaces and their connection with the chamber. Fig. 11 is a horizontal section of the same above the air-pipe; and Fig. 12 is a cross-section of the lower end of the heating-chamber on the line A″ A″, Fig. 10, and showing in place a petroleum-burner above its furnace. Sheet 6, Fig. 13, is a plan of a centering-chuck with its pyrometer, with the top plate removed. Fig. 14 is a side elevation of the same. Fig. 15 is a vertical section through the center of the chuck, showing in elevation the chucking-bar at the place where the pyrometer-band is cut and the ring which carries the cross-hairs mounted on the hub of the chuck. Fig. 16 is a side elevation of one of the other two chucking-bars, which are alike. Fig. 17 is a vertical section showing a side elevation of the pyrometer-index. Fig. 18 is an enlarged plan of the ends of the pyrometer-band and its connections to the index-lever, and Fig. 19 is a plan of the ring which carries the cross-hairs.

In Fig. 3, B is the jacket of the gun, resting upon the annular plate $a'$ $a'$, which in turn is supported by the flanged ring piece $b'$ $b'$ which form a detachable base. The latter is secured to the interior of the annular oil reservoir C′ C′ by a bayonet joint as shown in this figure, but more clearly in Figs. 10 and 12. The heating stand A′ is of cast iron, circular in form, of such diameter at the upper end, as to support the flanged ring piece $b'$ $b'$. The height is such as to afford convenient access to its interior, through openings J′, to adjust the apparatus hereinafter described as located within it. The base of the stand is enlarged and rests upon a horizontal foundation, to give stability to the gun and the apparatus which it supports. The heating chamber D′ D′ is composed of plate metal cylinders, united at their ends by hoops as shown in Fig. 7 or of boiler iron sheets secured as in boilers, the thickness of metal being such as to be capable of sustaining the brick lining of the chamber and also the entire gun, a part of which is to be heated therein. The brick lining on its interior, is cylindrical from top to bottom, but at its base and for a short distance above it, the casing is enlarged to provide for a series of furnaces Figs. 5, 10 and 12, around the heating chamber. The upper end of this iron casing, Figs. 7 and 9, is provided with eye bars secured to the casing and they must be capable of carrying safely all of the above mentioned weight. To the eyes of each of these bars, a chain is secured by a pin at one end, while the other end thereof is secured by a large link to the end of one of the beams Y Y so as to vibrate freely thereon, the length of these chains being such, that when the heating chamber is lowered over the tube so as to rest upon the assembling stand, as shown in Fig. 5, neither the cover $j$ nor its inclosed damper $i$ can come in contact with the beam X hereinafter described. Through the middle of each of these beams Y Y, a hole is bored to receive a turned end of the beam X so that the beams Y Y can vibrate freely thereon. The center of this beam X is provided with a hole $y'$ to receive the hook from a crane or hoisting device, which is capable of lifting and transporting the heating chamber with its accessories and its contents, to the assembling stand.

It is important that the jacket shall pass freely over the gun tube in the act of assembling, and therefore to give notice of anything which might retard the descent of the jacket, as for instance, undue friction upon the tube, I provide an index Z, Fig. 8. This index is composed of an iron pipe or rod of suitable length, upon the upper end of which is secured a small cap provided with a horizontal hole over the center of the pipe to receive a pin fastened in the side of the casing of the heating chamber, see Fig. 9, upon which pin the pipe can vibrate in a vertical plane. This cap also receives two brace rods, one on one side of the pipe, the other on the opposite side, and these brace rods extend downward to the lower end of the pipe to which they are secured. Between the cap and the lower end of the pipe, are two struts or cross bars through which the pipe passes, and over their ends the brace rods pass as shown, so that when these rods are tightened by screw nuts on the upper side of the cap, the pipe will be rendered very stiff, although the whole may be extremely light. To the lower end of the pipe is securely fastened a tapered rod, the lower end of which is drawn down fine so as to indicate accurately its position over the graduated scale $z'$ which is fastened to the side of the casing of the heating chamber directly beneath the pin upon which the index vibrates. A short distance from the vertical center line of the index, one end of a light chain is secured to the cap on the upper end of the pipe, the upper end of this chain being secured to one of the outer ends of the beam X, Figs. 7, 8 and 9. The length of this chain must be such, that when the hook of the crane has drawn everything up preparatory to hoisting, the index shall hang vertical. Whenever actual hoisting is attempted, all the chains in tension will stretch perceptibly, except the light chain. This will draw the index out of the perpendicular, and it will so remain as long as the whole weight lifted is suspended from the crane. If, in the act of lowering the jacket over the tube, the surface should come in such close contact as to create serious friction, the load upon the crane would be relieved thereby, the parts in tension would contract and the index point would move toward a perpendicular position. The operator would thereby be able to determine, whether to continue lowering or to raise the jacket and increase its temperature, preparatory to another attempt.

The petroleum burners $c\ c$ for heating the heating chamber $D'\ D'$ are similar to those used at present in welding furnaces and are shown Figs. 5 and 10. They are supplied with crude petroleum or other suitable oil or gas, from the small pipe $d\ d$, Figs. 5 and 10, the quantity required for each burner being regulated by the small valve $e$ shown in plan in Fig. 10, in which the pipe which carries the oil to the burner is also shown. The reservoir of oil $C'\ C'$ to supply the pipe $d\ d$, forms the base of the heating chamber $D'\ D'$, and the oil is conveyed to the pipe $d\ d$ by the vertical pipe $d'$ which passes through the upper plate of the reservoir (in which it is packed so as to be air tight) nearly to the bottom plate thereof. See Figs. 3 and 7.

The air for supporting the combustion of the oil, and a greater amount if desired is furnished from the large curved pipe E E. The quantity is regulated to each burner by a suitable valve, and the supply is furnished from a pressure blower or other known contrivance located where most convenient. The air is conveyed to the pipe E E at $f$ (Fig. 11) by a flexible tube of such length as will permit the heating chamber to be moved with its contents, the distance required for assembling, without rupturing or straining this flexible pipe. From the under side of the curved pipe E E a pipe E' is carried down to, and passes through the upper plate of the reservoir $C'\ C'$, in which it is packed so as to be air tight, and the pressure of air supplied to the burners must be at least sufficient to force the oil up through the pipe $d'$ to the burners. The air pipe E' and oil pipe $d'$ pass downward to the oil reservoir through openings between the furnaces $g\ g\ g$, and below these furnaces are openings in the brick work and through the casing, for packing their passage to the reservoir $C'\ C'$. See Fig. 12. The oil burns at the lower end of the burners $c\ c$, and in the furnaces $g\ g\ g$, Figs. 5, 10 and 12, which are formed in the brick work which surrounds the heating cavity of the heating chamber $D'\ D'$, and communicates with this chamber by the openings $n\ n\ n$, Figs. 3, 5, 10 and 12, formed in the brick work, through which the heated products of combustion pass into the heating cavity of the chamber $D'\ D'$.

Surrounding the lower end of the burners, I provide short cylinders of metal $C''\ C''$, Figs. 5 and 10, which are open at both ends, the object of which is to prevent the flame from spreading, and thereby produce a downward current, which will draw air into the furnaces $g\ g$. In its passage through these furnaces, this air will be heated by the flame, so that the discharge into the heating chamber $D'\ D'$ will be large in volume but of moderate temperature. These heated gases and air pass up through the chamber $D'\ D'$ and have escape through the opening F, Figs. 3 and 5, which opening is provided with a butterfly or other kind of damper $i$, by means of which the requisite pressure can be maintained within the heating chamber. The top of this chamber is provided with a large annular cover plate G G, Figs. 3, 5 and 7, the opening in the center of which, is large enough to permit the muzzle end of the gun tube to pass through it freely, and to leave sufficient space between this tube and the cover plate, for the escape of the heated gases from the burners. This opening in the large cover plate, is covered by a smaller annular cover plate $j\ j$, Fig. 3, in the center of which is the above described opening F and butterfly damper $i$.

On top of the jacket B' is mounted the supporting stand H, Figs. 3 and 5, in which is placed the pulley $k$, over which passes the wire or cord $l\ l$, one end of which is attached to and supports the upper centering chuck while the other passes through the jacket and chucks around the pulley I in the base of the heating stand A', and thence up to the drum K, Figs. 3 and 4, to which drum it is secured, by means of which apparatus, the chucks are raised and supported in position within the jacket.

The upper centering chuck, Fig. 3, is provided on top with a tripod shaped handle, to which the wire cord is hooked, and inside this tripod an incandescent light is fixed, the top of which is covered with a case or reflector which confines the light to the small opening in the center of the chuck. The electric current for this light is carried by a wire passing from the heating stand A' through the openings in the chucks. From the under side of this upper chuck three or more chains are suspended, the lower ends of which are hooked into eyes provided for that purpose, on the upper side of the middle centering chuck. The length of these chains must be such that when the upper chuck is close to the under side of the supporting stand H, the middle chuck will be two or three inches below the shoulder on the interior of the jacket if there be such shoulder, this length being provided in order that the longitudinal expansion of the jacket by heat, shall not jam the chuck against the shoulder.

The lower centering chuck is supported upon hinged brackets m m, Fig. 3, preferably three in number. The hinges are secured to the base plate a' a' by thumb screws n' n'. The inner ends of these brackets m m are provided with fine threaded screws n'' n'' for adjusting the chuck which rests upon their ends. The hub Q of this chuck is extended below the nut which clamps the plate P' to the hub, to provide support for a telescope N which is secured to the hub by the coupling nut m'. This telescope is provided with cross hairs which in conjunction with cross wires in the middle chuck and a small hole in the center of the upper chuck hereinafter described, enable the observer to determine the alignment of the chucks. These centering chucks are shown in Fig. 3 in proper position for observing the effect of the heat upon the jacket, and they must be removed before the heating chamber and the tube of the gun are moved from the heating stand A'. To remove these chucks from the jacket, their centering bars must first be permitted to draw inward to release the chuck as hereinafter described. The drum K is then turned, to lower the upper and the middle chucks so that the chains on the under side of the middle chuck can be hooked into the eyes on the upper side of the lower chuck, for which purpose the operator's arm can be passed through the openings in the chuck, or the chains or rods can be passed through the chuck and secured to its under side. The motion of the drum K is then reversed, so as to raise all of the chucks until the lower one is lifted clear of the adjusting screws in the end of the hinged brackets m m. The thumb screws n' n' are then released, and the brackets m m are allowed to swing down supported only by their hinges. On the inside of the heating stand A' are three tiers of hinged brackets o o, three or more brackets in each tier. The inner ends of the two upper tiers are now raised, until they rest against the inner side of the stand A'. The drum K is then turned, so as to lower the centering chucks, until the lower one rests upon the lower tier of hinged brackets o o. The raised ends of the second tier of brackets are then lowered so that they will act as brackets or shelves, and the motion of the drum K is renewed, until the middle chuck rests upon the brackets of the second tier. The raised ends of the third and upper tier of brackets are then lowered and the motion of the drum K is again renewed, until the upper and last chuck rests upon the brackets of the third tier. The wire or cord l is then unhooked from the last or upper chuck, and a light cord or wire sufficient to sustain the weight of the cord l, is attached to this unhooked end of the wire. The drum K is then turned to wind the wire l upon it, excepting a short length which passes under the pulley wheel I, and rests upon the foundation which supports the heating stand A'. The light cord or wire is then drawn over the pulley k and allowed to fall upon the chucks then within the heating stand A'. To place the centering chucks in the position shown in the drawing, the movements just described are reversed. Apertures J', Figs. 3 and 7, in the side of the heating stand give access to its interior so that the brackets, &c., may be manipulated. The middle one of the centering chucks such as is above referred to and shown in position in Fig. 3, is shown in detail and on a larger scale in Figs. 13, 14, 15, 16, 17 and 19, Sheet 6. Each of these chucks contains a pyrometer, and Fig. 13 is a plan of the same, with the upper cover plate removed, to show the interior more clearly. The construction of all the chucks is the same except that the upper one is provided with an incandescent light on its upper side and the lower one has a telescope attached to its under side as hereinbefore described. The frame of the chuck is composed of four pieces united by screws and nuts as shown in Fig. 15, where O O is a circular steel rim provided with short tongues let into the upper circular cover plate P and the lower circular cover plate P', which plates are secured to the rim O O by short tap screws as shown. At the center of these plates is a tubular hub Q, the exterior of which is enlarged between the plates, to form a shoulder, against which the plates are forced by the nuts p p which are secured on the projecting ends of the hub Q, thus securing the hub to the plates. The above forms the frame of the chuck which as thus constructed, will be both light and very rigid. Between the plates P and P', and secured to P, three pairs of supports R R are placed to carry the inner ends of the centering or chucking bars q q. The supports R R are secured to the plate P by through-bolts or they may be secured in any other suitable manner. Each pair of supports R R is provided with a shaft r and between each pair, a short lever arm S, is mounted and firmly secured upon the shaft r. To the other end of this lever arm S the inner end of a chucking bar q is secured by a pin joint; the outer end of the chucking bar is supported by the rim O O through which a hole is bored, for this bar to slide freely therein. The three shafts r r r are geared together by two pairs of miter wheel segments s s s s which are respectively mounted upon and firmly secured to the ends of the shafts r r r which project beyond the supports R R R for this purpose, so that the movements of the chucking bars q q must be through equal spaces. The short lever arm S which is mounted upon the shaft $r$ between two segments $s$ $s$, is provided with a projecting tail piece so as to form a bell crank. Shown by dotted lines in Fig. 16. To the long arm of this bell crank, a wire cord $t$ is attached, which cord must be long enough to pass out at the lower end of the piece to be heated and into the heating stand, so that a weight may be attached thereto, to force the chucking bars against the interior of the piece mounted upon the heating stand. As thus arranged, the weight of the cord $t$, its bell crank and the miter wheel segments, all tend to force the chucking bars $q$ $q$ $q$ outward, but to place the chucks in the position shown in Fig. 3 it is necessary that the chucking bars shall be drawn inward to clear the interior surface of the piece of the gun in which the chucks are to be placed. For this purpose, and also for another hereinafter referred to, I provide a spiral spring T for each chucking bar, and this spring is wound so that the bar can pass freely through it. One end of this spring abuts against the rim O O and the other against a collar U or pin, screwed, or secured to the inner end of the chucking bar, and for the purpose of drawing these bars inward, the compression of the spiral springs is required to be slightly in excess of the weight above referred to. After the chucks are in the positions shown in Fig. 3, a weight attached to the lower end of the wire cord $t$ of each chuck, slightly in excess of the sum of the compressions on the three spiral springs T T T in each chuck, will force the chucking bars outward against the interior of the piece of the gun in which the chuck is mounted, and center it truly therein.

The pyrometer is composed of a brass band V V of an exterior diameter slightly in excess of that of the interior of the piece, the temperature of which it is designed to measure, and of a width to permit it to play freely between the plates P and P' of the chuck. It has a gap in it as shown in Figs. 13 and 14, and on the side opposite the gap it is attached to the rim O by a pin $u$, which is firmly secured in the rim O and passes through a hole in the band V V, of a size to fit easily over the pin. There are oblong holes through the band V V opposite the ends of the chucking bars $q$ $q$, so as to permit the bars to pass through it, and to permit the expansion of the band without affecting the position of these bars. On each side of these bars are links $v$ $v$ secured respectively to the band V V and the collar U U by pin joints. The links of the chucking bar $q$ which passes through the gap in the band V are secured to the ends of the band V V on either side of this bar. All of these links $v$ $v$ are of such length that when the chucking bars $q$ $q$ $q$ are in contact with the interior of the piece of the gun they are designed to center, the band V V will also be in contact with the interior surface of the same piece, and that this band may not affect the outward movement of the chucking bars, the pin holes in the ends of the links $v$ $v$ may be cut away slightly toward each other so that if the band should fail to rest throughout against the interior surface it is designed for, that is to say, if it should not go out far enough, this will not prevent the chucking bars from reaching it. The band V V with a gap in it as before described, acts as a spring, and beds itself against the interior surface of the piece of the gun and must be drawn inward like the chucking bars $q$ $q$ $q$ in order that the chucks can be centered to the positions for them. Shown in Fig. 3. For this purpose the spiral springs T T T are made stiff enough to compress the band V V, in addition to the strength required for drawing the chucking bars inward. After the chucks are raised to the positions shown in Fig. 3, a weight W must be attached to the wire cord $t$ of each chuck, sufficient to compress the springs T T T so as to center the chuck and to permit the band V V to bed itself against the interior surface of the piece in which it is placed. To permit the cord to pass from the upper chuck through the two lower ones and from the middle one through the lower one, I provide the holes $t'$ $t'$ $t'$ in each chuck so that one cord shall not interfere with another. This contemplates suspending the chucks so that the index plates hereinafter described shall each have one third of a circle in which they can be placed without one overlapping another as they are suspended one above another within the piece of the gun, whereby each one will be visible from the heating stand.

The pyrometer band V V is made of brass which expands under a given increase of temperature, to a greater degree than the steel of the gun against which it rests. It therefore follows that when both are heated, the greater expansion of the brass band will force the ends of the band to approach each other, and the measure of this approach at each band, will afford a correct determination of the temperature there. For the purpose of measuring this expansion and of affording a visible indication thereof, I provide a glass circular index W' mounted on pivots as shown in Fig. 17 and projecting into the axial opening through the tubular hub Q as shown in Fig. 13. An opening $q^x$ is cut in the hub Q to permit a part of the periphery of this index to play freely through it as shown in Fig. 15. On the spindle upon which the index W' is mounted, a small pinion $w'''$ is secured which gears into a segment of a wheel on the end of a lever arm $w$. This pinion has a flange on each side of the teeth, which flanges are slightly beveled to afford lateral support for the segment on the line of centers only, so as to avoid undue friction, and the radius bars X X, Figs. 13 and 17, serve to maintain the teeth of the pinion and segment wheel in proper relation with each other. One end of the pyrometer band is attached to the lever arm $w$ by a link $w'$ at the pin joint of the radius bars and the lever arm, as shown in Figs. 17 and 18, and by dotted lines in Fig. 13, while the other end of the band is attached to the outer end of the lever arm $w$ by the two short links $x\ x$ as shown in the same figures. As thus arranged, when the ends of the pyrometer band approach each other, the lever arm $w$ will be moved so as to rotate the index $W'$, and graduations upon its circumference to degrees of temperature, will indicate the temperature. As the index of each chuck is independent of the others, the readings of each, will give the temperature at their respective locations within the piece, as it is heating and when heated.

When the pyrometer band $V\ V$ is attached to the lever arm $w$ as described above, it is evident that some provision must be made to permit the band to be compressed without turning the segment on the lever arm $w$ so far, as to be out of gear with the pinion on the spindle of the index $W'$. For this purpose the connection $v'$ of the link $w'$ to the end of the band $V\ V$ is a yielding one and can vibrate about the pin joint $x'$, Figs. 13 and 18. The short lever $v'$ which vibrates about this pin joint is provided with a foot which rests upon the band $V$ and is held against this band by the spiral spring $y$ which is wound around a stem that has its support at one end on the link $v'$ which vibrates about the pin joint $x'$, while the other slides through a support attached to the links $v\ v$ by a pin joint at $x''$. The spring $y$ is compressed between the head of the stem on the link $v'$, and the support between the links $v\ v$ and it must have stiffness sufficient to maintain the connection $v'$ in the position shown, so that the expansion of the band $V\ V$ may rotate the index $W'$. When the band $V\ V$ is compressed to insert or to remove the chuck as described, the lever arm $w$ will be forced against the pin $Z$ in the end of the block which supports the radius bars $X\ X$, and as the arm can then move no farther, the connection $v'$ will yield the further distance required, to enable the band $V\ V$ to be compressed the amount required.

To determine whether the piece has been bent with the heat applied to expand it, I provide a circular glass plate in the tube of the hub $Q$ of the upper chuck, Fig. 3, immediately under the incandescent light located on the upper side of this chuck, as previously described. This glass plate has a small hole in its center which may have roughened edges to render its outline more distinct, while the middle chuck is provided with a tube $Y$ carrying fine cross wires about in the plane of the chucking bars $q\ q\ q$, and the lower chuck is provided with a telescope and cross hairs, previously described, by means of which the alignment of the chucks and consequently the straightness of the piece in which they are centered, can be determined at sight. The telescope also enables the observer to read the indexes $W'$ in each chuck, whereby the temperature at each chuck can also be determined at sight.

When the jacket $B$ is mounted upon the heating stand $A'$ with the chucks arranged within the jacket as shown in Fig. 3, the first operation will be to adjust the lower chuck in line with the two upper ones, which latter will be at right angles to the axis of the jacket, owing to their mode of suspension, the upper chuck being drawn up to the under side of the supporting stand $H$ so as to just touch it, and all will become central as soon as the chucking bars $q\ q\ q$ in each chuck are forced outward by suspending a proper weight to the wire cord $t$ of each chuck. The lower chuck rests upon the adjusting screws $n''\ n''$ and to adjust this chuck, the electric current is turned upon the incandescent light on the upper chuck, to illuminate the small circular opening under it, as also the cross-hairs in the middle chuck. The adjusting screws $n''\ n''$ are then manipulated, to bring the cross-hairs in the telescope in range with the circular opening, under the light in the upper chuck, and when this is accomplished, if the bore through the jacket is true, the cross-hairs in the middle chuck should be in the same range. In case all three chucks are not then in range, they must be released by raising or removing the weight from the wire cord $t\ t\ t$ and readjusting the whole again, until repeated trials have shown, that the apparent error is caused by the crooked bore of the jacket, and not by the adjustment of the chucks. If this error is not large, allowance for it may be made by giving increased temperature to the jacket, so that it will pass over the tube although it may not be absolutely straight. The condition of the bore, having thus been determined to be satisfactory, the burners are then ignited in the small chambers, which surround the cavity of the heating chamber $D'\ D'$, when the products of combustion will pass up through the heating chamber and escape at $F$. When the jacket is supposed to be approaching the proper heat, observations should be made through the telescope, to determine the temperature as shown by the glass index plates. When the temperature of all parts of the jacket has thus been determined to be high enough, and that the bore through it is straight enough, the telescope and chucks must be removed, and the heating chamber with its contents be raised from the heating stand, and transferred to a point over the tube upon which it is to be imposed, which is mounted upon the assembling stand as seen in Fig. 5, but if the bore through the jacket is not straight, the amount of error can be easily determined before the chucks and telescope are removed, and if not too large, allowance can be made for it by raising the jacket to a higher temperature. If the deflection of the bore is too great, this fact can also be determined before an attempt is made to assemble it upon the tube, and it should then be suffered to cool and be rebored.

The assembling stand 20 upon which the gun is mounted, is shown in Fig. 5. It has a broad base to rest securely upon a horizontal foundation. It is provided with a platform or flange 21, to support the heating chamber, the detachable base $b'$ $b'$, of which is shown as resting upon this platform. The upper end of the stand 20 above the platform 21, is cylindrical and of a diameter that will pass freely into the end of the jacket which supports the breech plug. The interior is also cylindrical, and of a diameter which will afford sufficient thickness of metal between the interior and exterior diameters to support the gun securely. The upper end of this cylindrical interior is partially closed by an inwardly projecting flange 22, through the center of which, the pipe 23 passes freely, and around this pipe are openings through the flange 22. Shown also in plan in Fig. 6. The lower end of this cylindrical interior chamber, is closed by a cap 24, which is provided with a long hub 25, projecting into the interior chamber. This hub is bored to fit easily upon the pipe 23, which is here turned true. The cap 24 on its exterior and under side, is provided with a stuffing box 26 which is bored to the same diameter as the long hub. The pipe 23 passes through the stuffing box 26, the long hub 25 and the flange 22, which support it laterally, and projects above the upper end of the stand 20, nearly the length of the gun tube 27, and is supported vertically by the collar 28 firmly secured to it, and resting upon the upper end of the long hub 25. Above the collar 28, the pipe 23 may be rough, and between this collar and the flange 22 and upon the outside of the pipe 23, is a stiff spiral spring which is partially compressed against the flange 22, by the hub 25 when the cap 24 is bolted to its place, for which purpose the bolts which secure this cap to the stand 20, are made longer than necessary for simply bolting the cap to place. To the lower end of the pipe 23, a pipe 29 is attached, and upon this latter a valve is mounted, to regulate the flow of fluid therein. In the side of stand 20 and above the cap 24 and communicating with the cylindrical interior of the stand, is attached another pipe 30 which is also provided with a valve to regulate the flow of fluid therein. A reservoir of water or other cooling fluid is provided at such height above the upper end of pipe 23, as will create a rapid flow through this pipe, when the gun tube is in place as shown in the drawings, and when either pipe 29 or 30 is connected to the reservoir, the valves on 29 and 30 are opened, one to permit the entrance, and the other the escape of the water. In lieu of this reservoir, other means for creating such a flow may be employed, as for example, a pump.

The gun tube 27, is mounted upon the upper end of the stand 20 and between its lower end and the stand, a packing is provided of any kind, that will secure the joint between the two, against the escape of the cooling fluid. The upper end of the pipe 23 is provided with a collar 31 firmly fastened to it, to which the bolts 32—32 are secured. These bolts pass upward through the cap 33, and screw nuts upon their ends serve to clamp this cap against the upper end of the gun tube 27. Between the cap 33 and the upper end of the gun tube 27 a packing similar to that at the lower end of the tube is provided, to prevent the escape of fluid between the cap and the upper end of the gun tube.

It will be observed that clamping the cap 33 against the top of the gun tube as described, will tend to lift the pipe 23, and compress the spiral spring between the collar 28 and the flange 22. The space between the collar 31 on top of the pipe 23 and the under side of the cap 33 must be such that at all times there will be room for a free passage of cooling fluid, through this space.

In the act of assembling, the heated jacket in its heating chamber, if provided with a shoulder, is lowered over the muzzle of the tube, until the shoulder within the jacket is in contact with the shoulder upon the tube, and the drawings represent the jacket and the tube in this position, with the heating chamber lowered away from the jacket and resting upon the flange 21. The gun tube in this case being longer than the jacket B, and longer also than the heating chamber $D'$ $D'$, the supporting stand H on top of the jacket B will be arrested by and will rest upon the cap of the gun tube 33, as the jacket and the heating chamber are lowered, and the cover plate $j$ $j$ will rest upon the top of the supporting stand H when the lowering is continued, as shown in Fig. 5, so that when the jacket is in place on the tube, the supporting stand H and the cover plate $j$ $j$ will be above the top of the heating chamber $D'$ $D'$. As the heated jacket descends over the cold tube, the interior of the jacket is cooled by the tube, which without resistance, would contract it, but it cannot contract until a sufficient thickness of the jacket has been cooled to compress the exterior part of the jacket, the heat and dimensions of which are maintained by the heating chamber which moves with it. Maintaining the heat therefore, in the exterior of the jacket while the jacket is being lowered over the cold tube, has the effect of maintaining the interior of the jacket at the diameter it had assumed before assembling commenced, notwithstanding the cooling to which the interior of the jacket is subjected during the assembling operation. After the jacket B has been assembled upon the gun tube, the heating chamber $D'$ $D'$ must be removed, for which purpose, the chamber must be slightly raised to relieve its pressure upon the flanged ring piece $b'$ $b'$ and then turned about its axis, until the bayonet joint is clear. Then the furnace plate with the heating chamber can be raised, leaving the flanged ring piece $b'$ $b'$ and the annular plate $a'$ $a'$, which form a detachable base, resting upon the assembling stand 20, as in Fig. 5. As the heating chamber is raised, it will pick up the cover plate *j j* and close the opening in the top of the heating chamber, so that when the butterfly damper *i* is closed, a current of air through the heating chamber will be prevented.

It is very desirable that the jacket B while shrinking, shall first seize the tube 27 at the shoulder on the tube, upon which the jacket is resting, when it is lowered to its place on the tube, and that the lower end of the jacket shall seize the tube before the upper end. To effect this, the heating chamber is raised so that its bottom is slightly above the shoulder on the tube, where it remains suspended, in order to retain the heat in the upper end of the jacket. A spray of water is then directed against the exterior of the jacket opposite the shoulder on the tube, which is then just below the heating chamber, and a shield or wrapping may be secured around the jacket below the jets, to guide the water off from the jacket, if this end of the jacket is cooling too rapidly. After the jacket has been thus cooled so as to seize at the desired point, a flow of water is established within the tube 27 to cool it and consequently the jacket B from the interior. As the upper end of the jacket is within the heating chamber which will impart heat from this end, the lower end will cool most rapidly and seize before the upper end. After the lower end has seized, the heating chamber D' D' is raised clear of the tube, and the flow of water through the tube is continued until the temperature of both tube and jacket is lowered to that of the atmosphere or approximately so.

To impose the outer jacket upon the assembled jacket and tube, the muzzle end of the tube must be placed upon the top of the assembling stand and clamped thereon as before, with packing interposed between the tube and the stand, and between the top of the tube and the cap 33. The outer jacket is heated in the heating chamber D' D' or in this chamber shortened as described, and when the proper temperature has been attained, it is imposed upon the long jacket, by lowering it over the breech end in the same manner as this jacket was imposed upon the tube by lowering it over the muzzle end, and its subsequent treatment is the same.

As the outer jacket is so much shorter than the inner one, the proper amount of expansion can be determined by the ordinary means of measurement, which can be conveniently effected while it is in the heating chamber, and for the same reason, the liability to deflection is so small, that it is unnecessary to provide such centering chucks as those for the longer and smaller inner jacket.

The provisions hereinbefore recited for assuring proper conditions for assembling the parts with certainty, should avoid all risk of premature seizure, but if notwithstanding, any part should seize or should indicate seizure, before it has reached its proper position, the apparatus hereinbefore described affords the means for separating such parts without injuring them, or for separating the parts of the gun after it has been in service, so that a defective or an injured part can be removed and replaced with a perfect one, and the gun be restored to its original value without losing any part of it, except the defective part.

The principle which governs both the assembling and the disassembling of the gun is the same, and it consists in producing a difference of temperature between the parts which are to be assembled or disassembled, so as to alter their diameters enough, to permit the outer one to slide over the inner one. This cannot be effected after the gun is assembled, by heating one part and cooling the other at the same time, as in so doing no positive line of demarcation between the hot and the cold parts can be established, when they are in such close contact as in an assembled gun. If the gun tube with its jacket in place is filled with cold water and this temperature is maintained or nearly so, by a flow of such water through the tube, and heat is applied to the jacket, the heat would be carried off from the jacket so fast, that it could not be heated to the temperature required to separate the parts. Therefore, the parts which are to be separated, must all be heated at least to the temperature required for assembling the gun, before the cooling fluid is admitted to the tube. When this temperature has been attained, a flow of cooling fluid, preferably water, must be established through the tube to cool it as rapidly as possible, by which means the tube will have its diameter reduced so rapidly, that the jacket, which will lose but little heat, can be lifted off the tube. The time during which this difference of temperature can be maintained, is ample for removing the jacket, but if from any cause the parts should again seize before they are entirely separated, the water must be withdrawn from the tube, all the parts must be again heated, and the cooling operation must be renewed as before. The separation of the outer from the inner jacket is to be effected in the same way. The jackets must be heated at least to the temperature required for assembling them, and the inner jacket must then be cooled as rapidly as possible, and the parts must be separated before the outer jacket has time to contract.

As the separation of the parts of a gun which have been assembled, depends upon establishing the requisite difference of temperature between the parts for a limited time, the separation will be facilitated by providing means for establishing a flow of cooling fluid through the tube at a much lower temperature than that of water at its normal temperature. When this cold fluid is employed, it is not necessary to raise the temperature of the parts so high, before the cooling fluid is admitted. While it may not be desirable to use such a cooling fluid in every case, yet there may be occasions when it would be necessary, as for instance, when the parts had slid on each other in assembling, with too little clearance, and thereby had roughened the surfaces, or after a gun had been long in service, and the condition of the surfaces was unknown. I contemplate therefore, using a refrigerating apparatus, when it is required, to lower the temperature of the cooling fluid which flows through the tube, below that of water which can be conveniently obtained for this purpose. A refrigerating apparatus such as is now in common use for making ice, or for cooling beer vaults, or a tank of suitable size filled with ice or with ice and salt, would be suitable for this purpose.

To separate the parts of a gun after they have been assembled, as, for example, the two jackets from the tube, the flanged ring piece $b'$ $b'$ and base $a'$ $a'$ should be mounted upon the assembling stand 20, Fig. 5. The parts to be separated, jackets and tube, should then be mounted upon the assembling stand. The heating chamber must then be lowered over the jackets and tube, and secured to the flanged ring piece $b'$ $b'$ by means of the bayonet joint, and the cap 33 secured to collar 31. Heat must then be applied to the jackets until the temperature is raised throughout the jackets and tube at least equal to that required for assembling them. The heating chamber must now be raised until the base $a'$ $a'$ is in contact with the lower end of the jacket B, and the index Z must be adjusted as hereinbefore described. When the jackets and tube have acquired the proper temperature, a flow of cooling fluid must be established through the tube to cool it as rapidly as possible. A strain must then be exerted through the hoisting apparatus, and the heating chamber, upon the lower end of the jackets, which will cause the index Z to move from the perpendicular. When the jacket loses its hold upon the tube, the index will move automatically toward the perpendicular and at the moment the jacket is loosened upon the tube, the heating chamber and the jackets should be raised rapidly clear of the tube.

Having thus described the object and nature of my invention, what I claim as new, and desire to secure by Letters Patent, is—

1. A built up breech loading gun for ordnance, formed of a tube in one piece, through the axis of which is a bore to suit the diameter of the projectile to be used therewith, and a jacket which envelops the tube for a length, not less than ten times the diameter of the bore of the jacket at the breach end, said jacket being shrunk upon the tube, substantially as and for the purpose set forth.

2. A built up breech loading gun for ordnance, formed of a tube in one piece, through the axis of which is a bore to suit the diameter of the projectile to be used therewith, and a jacket which envelops all of that portion of the tube which is reinforced, which portion must not be less in length than ten times the diameter of the bore of the jacket at the breech end, said jacket being shrunk upon the tube, substantially as and for the purposes set forth.

3. A built up breech loading gun for ordnance, formed of a tube in one piece, through the axis of which is a bore to suit the diameter of the projectile to be used therewith, and a jacket of such length as to sustain the breech plug and to envelop all the surface of the tube which is to be reinforced, which surface must not be less in length, than ten times the diameter of the bore of the jacket at the breech end, said jacket being shrunk upon the tube substantially as and for the purpose set forth.

4. The improvement in the art of constructing a built up breech loading gun for ordnance, which consists, in making a tube in one piece of the length required, with a bore to suit the diameter of the projectile to be used therewith, and a jacket in one piece to envelop such portion of the tube as it is required to reinforce, then heating the jacket to the proper temperature, then imposing it upon the tube and maintaining the heat in the exterior of the jacket while so imposing it, substantially as and for the purpose set forth.

5. The combination of a portable heating chamber with the exterior parts of a built up gun, to maintain the heat in the exterior parts during the assembling and disassembling of the gun.

6. A portable heating chamber heated by vertical furnaces about its periphery, the upper ends of which are arranged for combustion chambers and the lower ends to receive the products of combustion and the air heated thereby, and provided with passages to transmit them to the heating chamber.

7. A portable heating chamber heated by vertical furnaces about its periphery, which are supplied with liquid fuel from an annular reservoir below the heating chamber, in combination with a detachable base to the heating chamber securable to the annular reservoir.

8. A water circulating stand arranged to receive the tube of a gun vertically mounted thereon, in combination with a pipe by means of which the tube is bolted to the supporting stand and through which a circulation of water throughout the interior of the tube can be effected.

9. A portable heating chamber in combination with a water circulating stand, provided with water inlet and outlet for effecting circulation within the portable heating chamber mounted thereon.

10. The art of separating the parts of a built up breech loading gun, which consists in heating all of the parts to the proper temperature, then causing a flow of cooling fluid to one end of that one of the parts which has the smallest bore, and throughout the length thereof that is covered by the part to be removed, and then when the parts have separated, moving the heated part or parts in relation to the cooled part, as required.

11. The art of separating the parts of a built up breech loading gun, which consists in heating all of the parts to the proper temperature, then maintaining this heat in the exterior parts, while cooling the interior part, by causing a flow of cooling fluid throughout the length thereof that is covered by the part to be moved, and when the parts have separated, moving the heated part or parts in relation to the cooled part, as required.

WM. SELLERS.

Witnesses:
  E. R. HARPER,
  WM. H. WOLF.